(12) United States Patent
Foix Robert et al.

(10) Patent No.: US 7,941,966 B2
(45) Date of Patent: May 17, 2011

(54) DEVICE FOR PROTECTING DIFFERENT ARTICLES AGAINST BIRDS, INSECTS AND DUST

(76) Inventors: Manuel Foix Robert, La Seu d'Urgell (ES); María Victoria Gómez Gámez, La Seu d'Urgell (ES)

(*) Notice: Subject to any disclaimer, the term of this patent is extended or adjusted under 35 U.S.C. 154(b) by 807 days.

(21) Appl. No.: 10/558,241

(22) PCT Filed: May 24, 2004

(86) PCT No.: PCT/ES2004/000233
§ 371 (c)(1),
(2), (4) Date: Nov. 23, 2005

(87) PCT Pub. No.: WO2004/103062
PCT Pub. Date: Dec. 2, 2004

(65) Prior Publication Data
US 2007/0011933 A1    Jan. 18, 2007

(30) Foreign Application Priority Data

May 23, 2003 (ES) .................................. 200301220
Feb. 9, 2004 (ES) .................................. 200400289

(51) Int. Cl.
*A01G 13/10* (2006.01)
(52) U.S. Cl. .......................................... 47/24.1; 47/20.1
(58) Field of Classification Search .............. 47/24.1, 47/31.1, 20.1, 23.4, 29.1, 29.5, 29.6, 30, 47/31, 32.4; 119/270; 206/484; 426/124, 426/129
See application file for complete search history.

(56) References Cited

U.S. PATENT DOCUMENTS

| | | | | |
|---|---|---|---|---|
| 383,327 A * | 5/1888 | Starr | ................................ | 47/24.1 |
| 436,287 A * | 9/1890 | Marshall | ........................ | 383/102 |
| 951,807 A * | 3/1910 | Erdly | ............................... | 47/29.5 |
| 1,025,073 A * | 4/1912 | Ragan | .............................. | 47/30 |
| 1,060,116 A * | 4/1913 | Oters | ................................. | 47/30 |
| 1,446,416 A * | 2/1923 | Curtiss | ........................... | 47/23.2 |
| 1,988,886 A * | 1/1935 | Wilson | .............................. | 47/84 |
| 2,939,248 A * | 6/1960 | Beck | ................................. | 47/5.5 |
| 4,384,604 A * | 5/1983 | DeLaura et al. | ............... | 206/423 |
| 4,750,292 A | 6/1988 | Alstig | | |
| 4,815,236 A * | 3/1989 | Tesch | ............................... | 47/31.1 |
| 4,825,578 A * | 5/1989 | Robinson | ............................ | 43/1 |
| 5,090,155 A * | 2/1992 | Rodgers | ............................ | 47/30 |
| 5,456,043 A | 10/1995 | Dacon, Sr. | | |
| 6,088,953 A | 7/2000 | Morgan | | |
| 2003/0009936 A1* | 1/2003 | Hodson | ........................ | 47/29.1 |

FOREIGN PATENT DOCUMENTS

| | | | | |
|---|---|---|---|---|
| CH | 634458 | A * | 2/1983 | |
| DE | 3524652 | A1 * | 1/1987 | |
| GB | 2129664 | A * | 5/1984 | |
| GB | 2212043 | | 7/1989 | |
| GB | 2212043 | A * | 7/1989 | |

* cited by examiner

*Primary Examiner* — Francis T Palo
(74) *Attorney, Agent, or Firm* — Kilpatrick Townsend & Stockton LLP

(57) ABSTRACT

The invention relates to a device for protecting different articles against birds, insects and dust. The inventive device consists of a tubular element (11) comprising a flexible mesh or a non-woven fabric, which can be closed at the upper and lower openings thereof and which encloses the article to be protected (9a,9b). The invention is also equipped with a series of hoops (17) or supports which keep the tube (11) at a certain distance from the article to be protected.

14 Claims, 9 Drawing Sheets

DEVICE FOR PROTECTING DIFFERENT ARTICLES AGAINST BIRDS, INSECTS AND DUST

The purpose of this invention refers to a device for protecting different articles against birds, insects and dust and, more specifically, for fruit, such as bunches of grapes while still on the vine, or foodstuffs, such as cold-cuts, dairy produce and herb products, and for all products that require protection against the mentioned aggressive agents.

BACKGROUND OF THIS INVENTION

In the world of cultivation, the care of certain products that are easily attacked by animals and/or insects has become the warhorse of many industries in the sector.

It is well-known that grapes on the vine and other fruit growing on trees are, in general, attacked by birds and insects that peck at the fruit to taste the juice, resulting in the fruit being spoiled and no longer suitable for sale.

Similarly, certain delicate flowers, such as roses, orchids and similar ones, are also damaged, by the attacking insects, inclement weather or dust and contamination.

Again referring to insects, these not only attack fruit, but they land on delicatessen products, on recently painted elements (lampposts and benches etc), ruining its quality and appearance.

BRIEF DESCRIPTION OF THE INVENTION

With the protective device of this invention, the previously described problems are resolved, since it will protect the object in question from inclement weather, insects and birds.

The same basically consists of a close-woven net in the form of a tube that can be closed at both top and bottom or only at one the ends, which contains the fruit or other article that is to be kept out of reach of birds.

The tube or tubular element should be understand as being the definition found in the Dictionary of the Royal Academy for the Spanish Language, namely, a hollow piece, commonly in cylindrical form and generally open at both ends.

This assumes that even through it preferably has a cylindrical form, it can also assume other appropriate configurations depending on the case.

The fruit or flowers etc are placed inside the device, but at a certain distance from the net, because if the said fruit or flowers etc are touching the net, the insects, birds and other pests can still attack and damage them in order to extract the juice.

At the same the hoops provide the device with rigidity, otherwise it would be easy for the animals to stand on and use their own weight to bring them close to the contents so that they may attack it.

The inventors have also observed that, on occasions, the articles to be covered are firmly fixed to a support, for example, a ham on a ham stand, a recently painted wall lamp etc, which means it is not possible to employ this protective device with these products in a convenient fashion.

To this end, the invention has been modified and improved as requested, so that for the types of articles mentioned in the previous paragraph, a cut has been made that divides at least one of the hoops and part of the tubular element.

This facilitates the positioning of the protective device because the said cut defines two ends which, once the protective device is in position, overlap and prevent the entry of insects, dust and animals etc.

In this way, the device can be adapted to any types of articles so that they become protected.

A BRIEF DESCRIPTION OF THE DRAWINGS

In order to facilitate understanding of the following description, eight pages of drawings are included, in which.

DETAILED DESCRIPTION OF PREFERRED EMBODIMENTS

Figure 1:
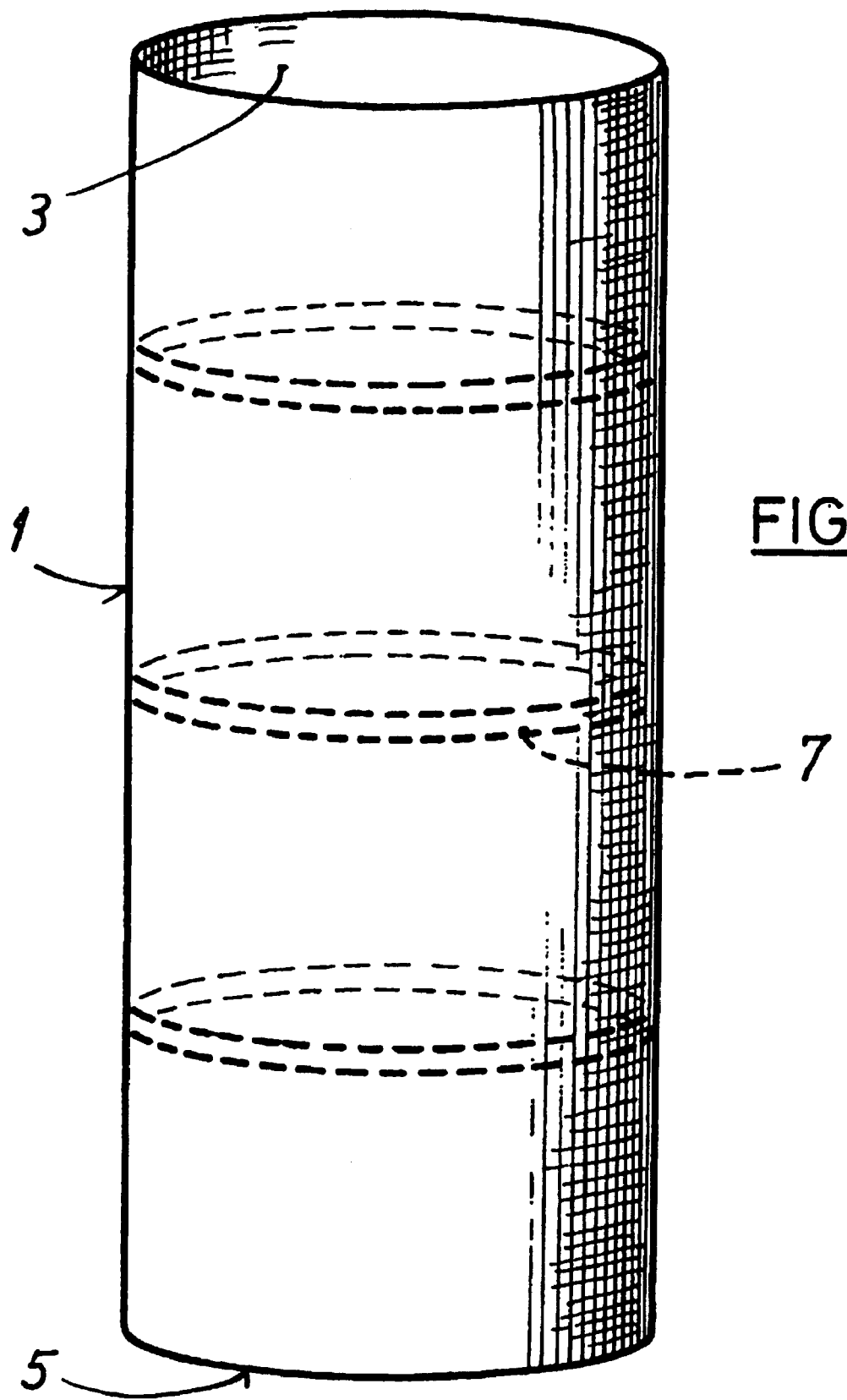
FIG. 1 illustrates an elevation view of the device prior to installation.

With reference now to the said figures (FIG. 1), the protective device of this invention consists mainly of a flexible anti-mosquito type of net 1, or non-woven fabric in tubular form and, in general, cylindrical, with upper 3 and lower 5 ends open and, in any case, the lower one 5 closed, inside of which are installed a series of rigid hoops 7 at regular distances that ensure that the inside of the cited tube 1 maintains a certain distance from the fruit 9 or articles to be protected.

Once installed (FIG. 2), the cited tube surrounds the said fruit 9 or articles, the upper 3 and lower 5 ends are closed using conventional closing elements, such as clips.

Figure 3:
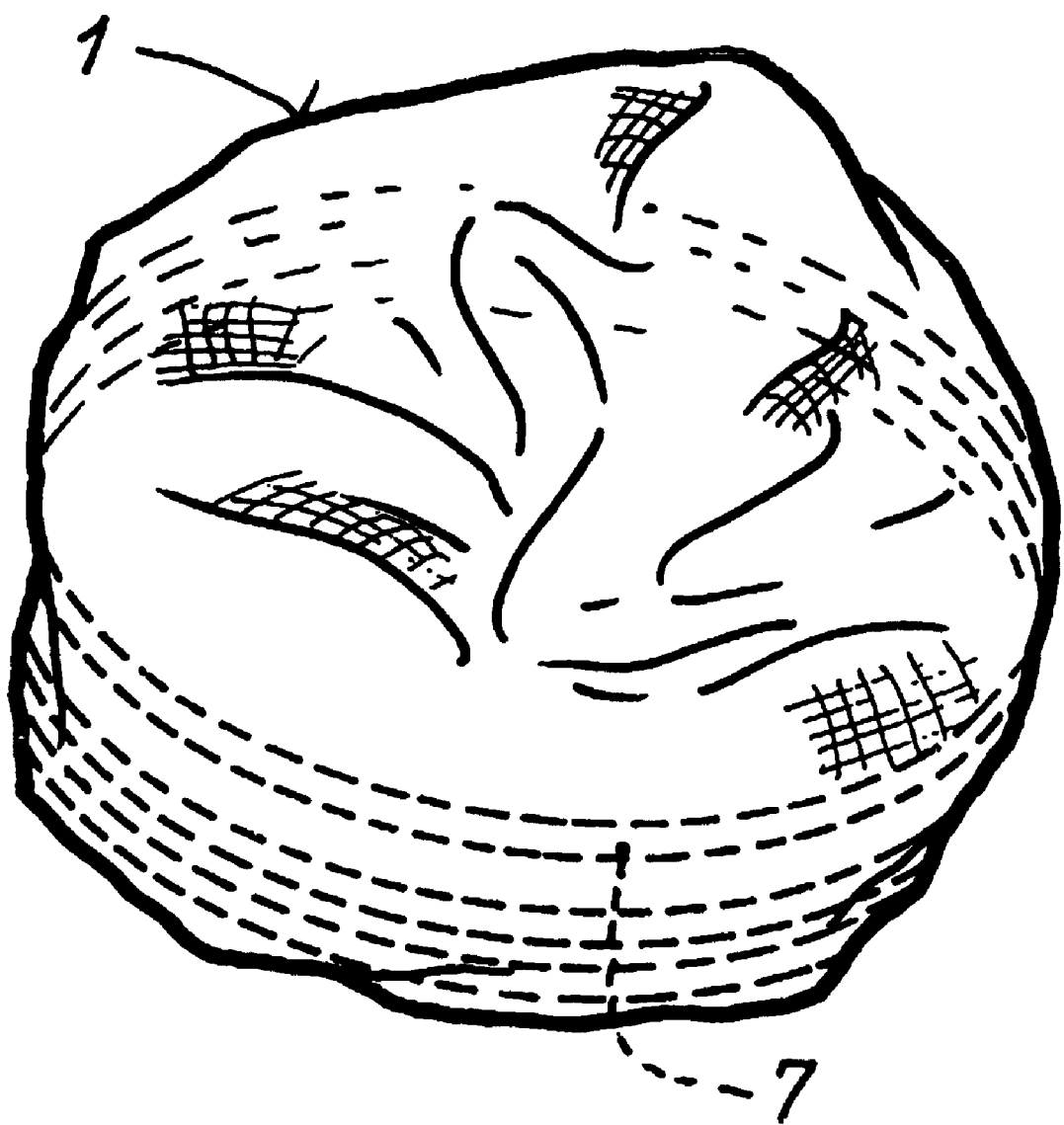
FIG. 3 shows the cited device when it is folded and not in use.

FIG. 3 shows the reduced space occupied by the described device when not in use: its flexible mesh 1 enables it to be significantly compressed, together with its hoops.

Figure 4:
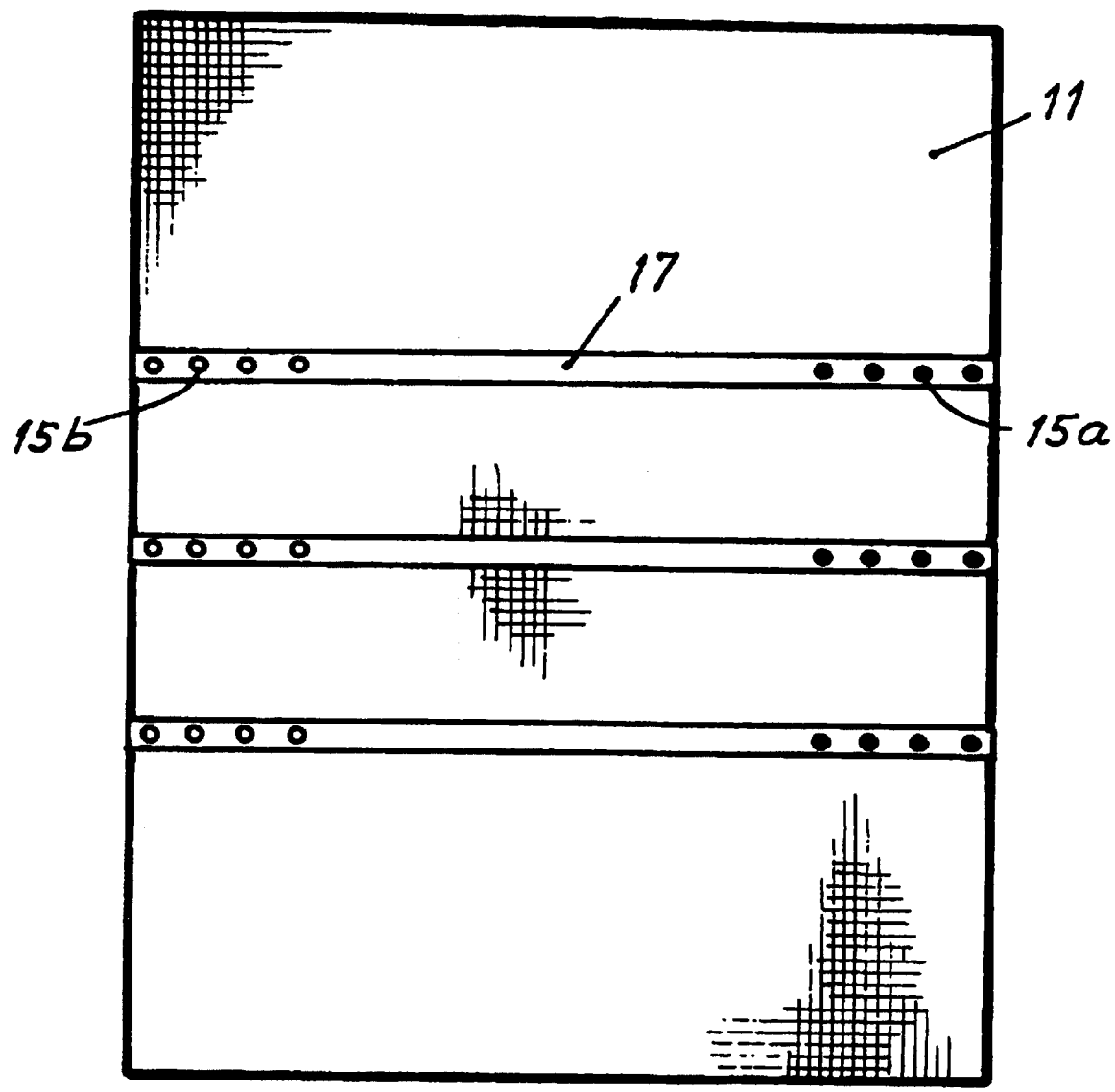
FIG. 4 is another elevation view of the cited device with a variation of its elements.

When convenient (FIG. 4), the tube can comprise a flat portion 11 of mesh of non-woven fabric that is rolled into the desired tube shape, which is then similarly supported by means of a series of adjustable flexible strips 17 which, in this case, are incorporated on the outside of the tube 11, with the ends of each strip 17 fitted with respective series of matching closing devices, for example, buttonholes 15a and buttons 15b that are suitably fastened.

Figure 5:
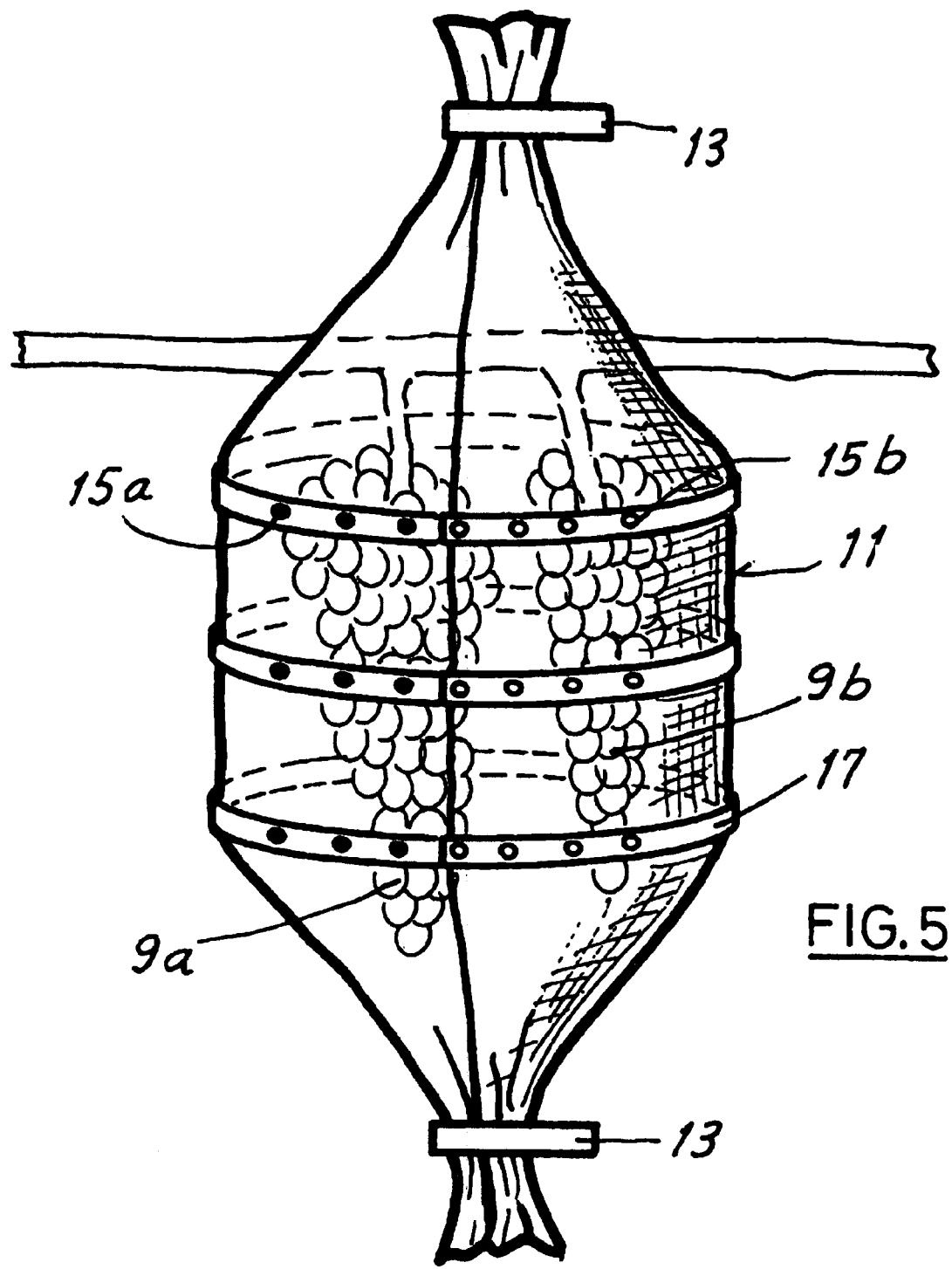
FIG. 5 is a view of the device in FIG. 4 once it has been installed.

This second version (FIGS. 4 and 5) have an advantage over the first in that the protective tube 11 diameter can be adjusted using the cited adjustable hoops 17; FIG. 5 shows the referred tube 11 with its maximum diameter housing two bunches of grapes 9a and 9b.

In any case, the cited mesh tube 1, 11 should be sufficiently close-woven so that it prevents birds and insects from accessing the inside of the tube through the holes, and which will be made of a mesh or non-woven fabric that is innocuous to the food products inside.

Figure 2:
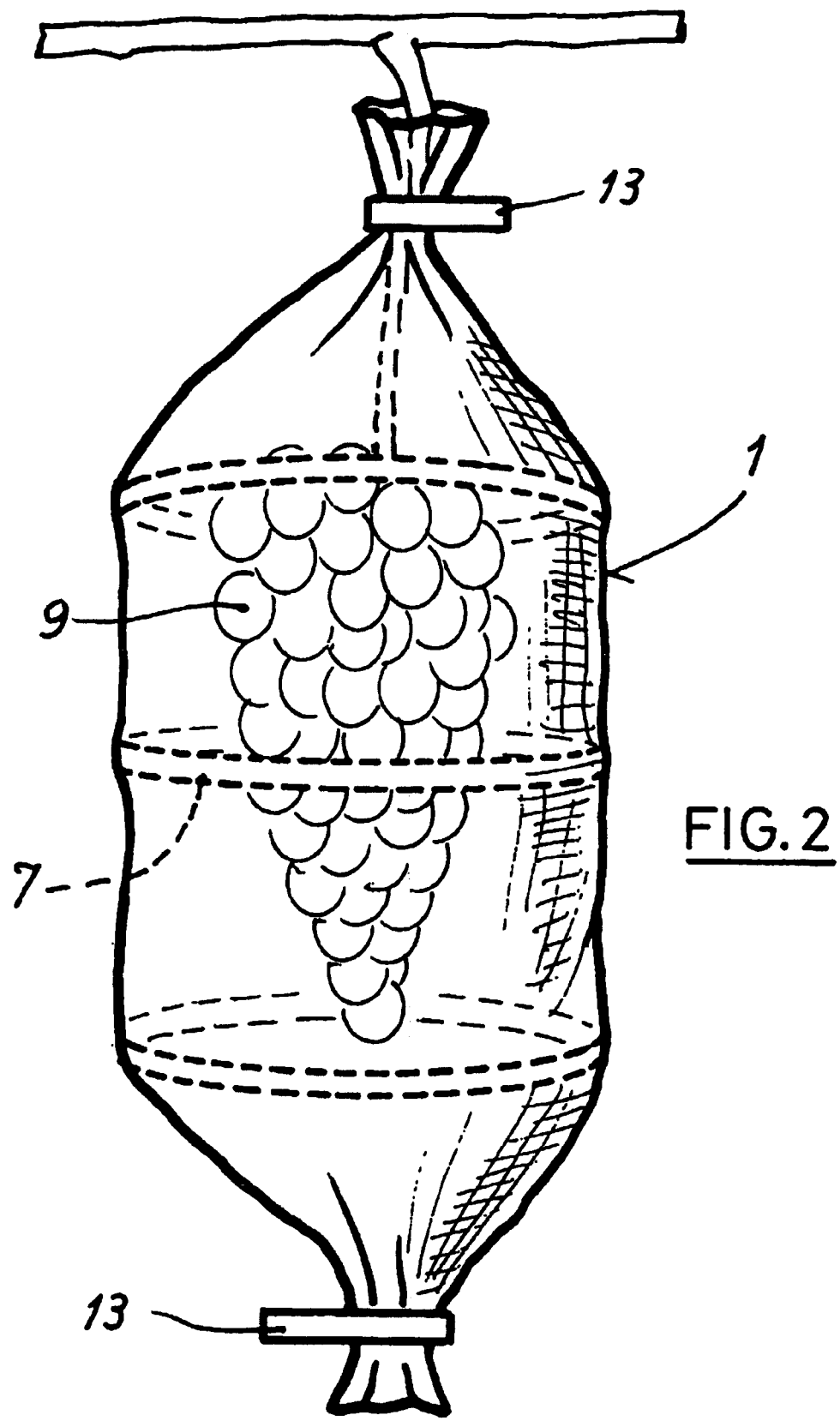
FIG. 2 is another elevation view of the same device, once installed and surrounding a bunch of grapes.

The strips 17 can be joined to the protective tube 11 either by the inside of the same (just as illustrated in FIG. 2), or by the outside of the same (just as shown in FIG. 5).

With reference now to the other figures, the protective device of this invention (FIG. 6) principally consists of a tubular element 1, manufactured from a flexible anti-mosquito type of net or non-woven fabric in tubular form and, in general, cylindrical, with upper 3 and lower 5 ends initially open and subsequently closed by means of closing elements 13, and where the inside of the non-woven fabric 1 is supported on a series of rigid hoops 7 at regular distances, which ensures that the inside of the cited tubular element 1 remains at a certain distance from the ham 9 or other articles to be protected.

It is necessary to point out that a cut is made which, in this case, is from the lower end 5 to the closest hoop, so that the ham 9 can be positioned inside, in spite of the fact that the said ham is secured to a ham stand 6, which has a support 12 that raises the ham 9 into a cutting position, holding it thus immobile so that the ham 9 can be cut, without moving.

The said cut 8 defines two ends and these ends tend to close when they surround the ham 9, with one end overlapping the other. In this embodiment example, a cut has been made from the lower end 5 to the hoop closest to the said end 5, although it could be made from the upper end 3, or cutting more than one hoop.

Figure 7:
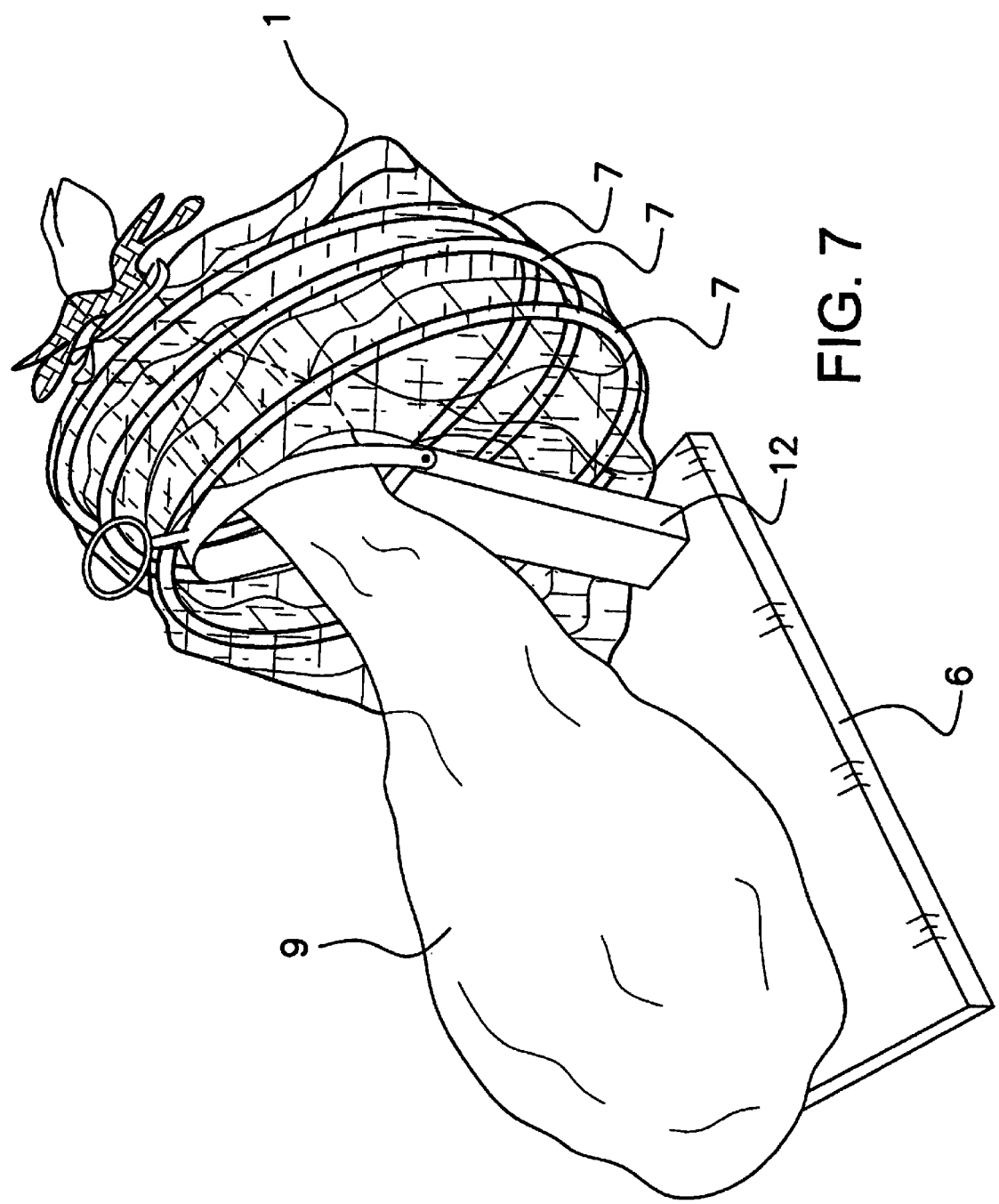
FIG. 7 is another perspective view once the device has been folded over the upper end of the ham leg and not in use.

When it becomes necessary to cut the ham 9, the lower means of closing, for example, some clips, are removed and then the tubular element 1 is folded towards the ham 9 foot leaving an area of ham 9 exposed for cutting (FIG. 7).

Figure 6:
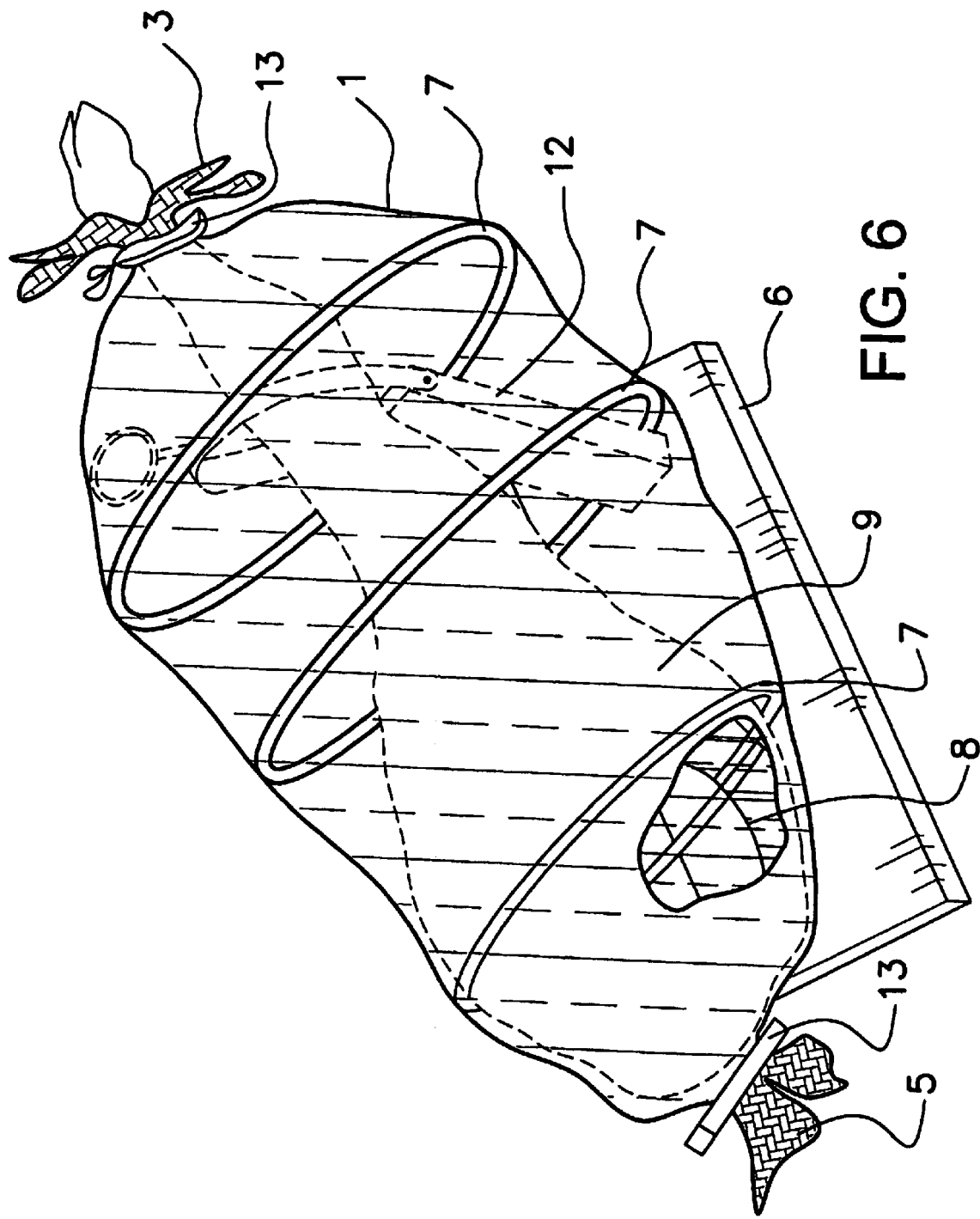
FIG. 6 is perspective view of the device applied to a ham on a ham stand.

Subsequently, once the ham 9 has been cut, the reverse operation is performed, so that, in order to cover the lower part of the ham again, the ends defined by cut 8 are overlapped and the tubular element 1 is closed, thus preventing the entrance of insects and dust, maintaining the ham's 9 characteristics intact (FIG. 6).

In the same way as the previous example, in any case, the cited non-woven fabric of the tube 1 must sufficiently close so as to prevent birds and insects from passing through and also be made of a material that is innocuous to the food products.

Figure 8:
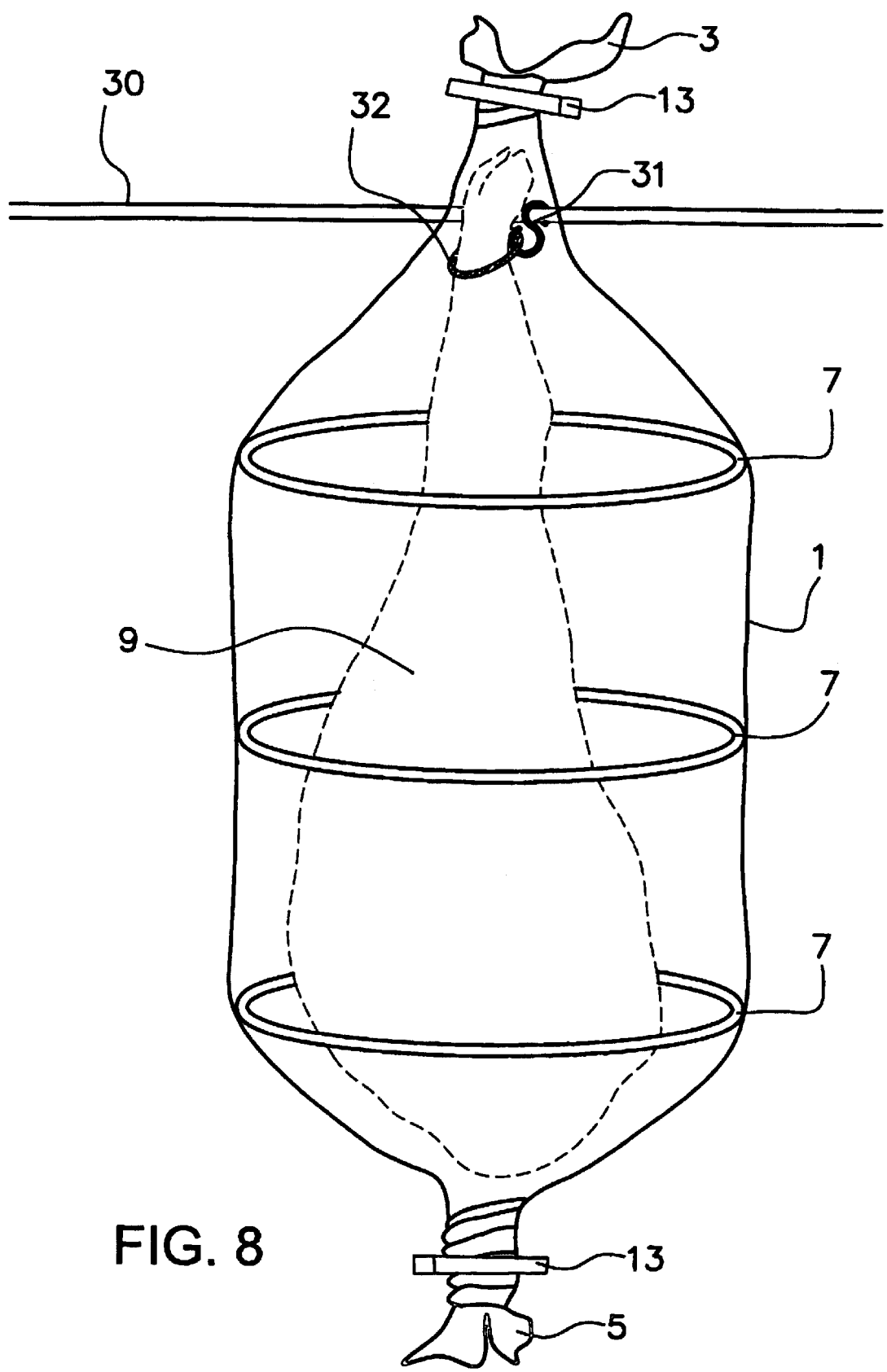
FIG. 8 is a view of the device applied to a hanging ham.

FIG. 8 is a new option in which a ham is used hanging from a cord 32 fixed to a hook 31 that is secured to a support 30, for example, a bar. As is well-known, hams have to be hung during their curing process but, at the same time, they have to be protected from insects that could spoil them.

Just as can be seen, the hook is inside the tubular element 1 and when the ham 9 is hung, the hook 32 pinches the tubular element, but without tearing it and the said ham is hung from the bar 30, which prevents insects entering the tubular.

Figure 9:
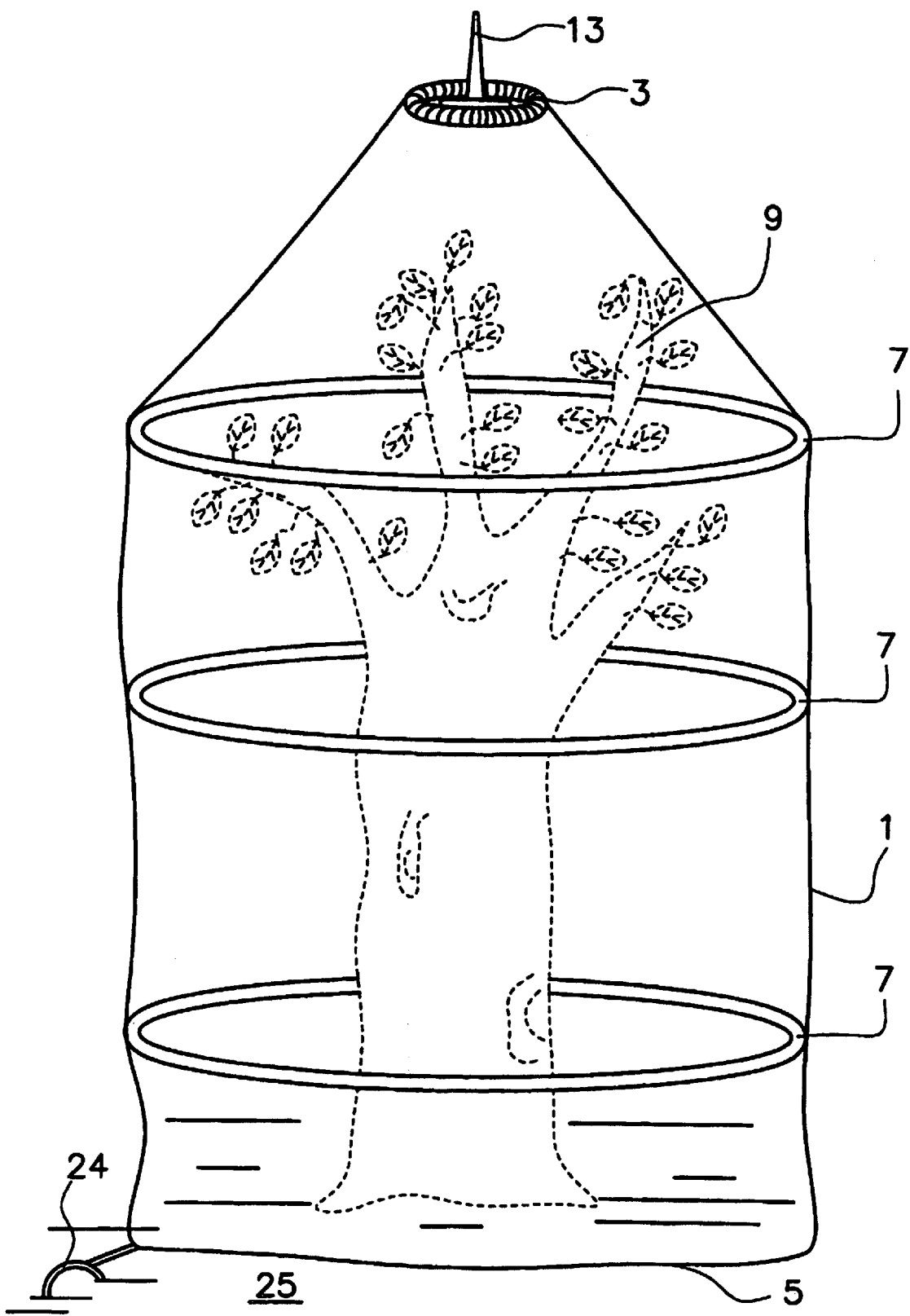
FIG. 9 is a view of the device applied to a tree.

Lastly, FIG. 9 is a final variation in relation to a tree 9, for example, a fruit tree. The fruit of certain trees is highly-prized and because of this, damage to just one fruit or flower can lead to great economic losses to agriculturists.

Thus, it can be observed that in this case, the upper end 3 is closed by some means of closing 13 and the lower end 5 is in contact with the ground 25, with the said tubular element 1 fixed to the ground 25 by some means of securing 24, so that the tree is protected from any type of inclement weather and/or insects etc.

Through the previous description, the efficient protection that this device provides to fruit and other various products against aggression by birds, insect and dust is quite evident.

In any case, it must be understood that the said protection is not limited to just these articles, but can be extended to elements of other natures, such as a recently painted element to which access by insects is not desired since they will stick to it and spoil their finish. Having fully described the nature of this invention, it is stated for the record that this protective device for fruit and other various articles from birds, insects and dust can be manufactured using the most suitable materials and the most suitable size, with all of this falling into the spirit of the following claims.

The invention claimed is:

1. A device for protecting various articles against birds, insects and dust, comprising:
a tubular element comprising a body of flexible mesh or non-woven fabric; and at least one hoop or support, characterized in that no hoop or support is provided at the upper and lower ends of the tubular element such that the upper and lower ends of the tubular element can be closed off by closing elements to enclose an article to be protected inside, with the tubular element maintained at a certain distance from the mentioned article to be protected by the at least one hoop or support, wherein a cut divides at least one of the hoops or supports and one end portion of the tubular element, with the cut defining two ends of the tubular element, and wherein the two ends of the tubular element are superposed when closed.

2. A device, in accordance with claim 1, wherein the at least one hoop or support comprises a plurality of hoops or supports that are separated from each other by a predetermined spacing, and wherein each of the hoops or supports are joined to the tubular element by at least one point.

3. A device, in accordance with claim 2, wherein the tubular element comprises a flat portion of flexible mesh and wherein each of the plurality of hoops or supports comprise a flexible strip having ends that are fitted with matching joining elements, and wherein the strips are mounted on the mesh once the mesh has been rolled into a tube having the desired diameter.

4. A device, in accordance with claim 2, wherein the plurality of hoops or supports are located in a lower section of the device.

5. A device, in accordance with claim 2, wherein the plurality of hoops or supports are mounted on an outside of the tubular element.

6. A device, in accordance with claim 1, wherein the at least one hoop or support is mounted on an inside face of the tubular element, and wherein the at least one hoop or support is substantially rigid.

7. A device, in accordance with claim 1, wherein the at least one hoop or support comprises a plurality of hoops or supports, wherein the cut is made from one of the ends of the tubular element to the hoop or support located closest to the cut end of the tubular element, and wherein only the hoop or support located closest to the cut end of the tubular element is cut.

8. A device, in accordance with claim 7 wherein the cut end of the tubular member is the lower end.

9. A device, in accordance with claim 1, characterized in that the said flexible mesh or non-woven fabric for the tube is innocuous to food products.

10. A device, in accordance with claim 1, further comprising first and second clips that are used to close the upper and lower ends of the tubular element.

11. A device, in accordance with claim 1, wherein the location of the at least one hoop or support allows material forming the upper and lower ends of the tubular element to be brought together to close the upper and lower ends of the tubular element.

12. A device for protecting an article from attack by birds, insects and other elements, comprising:
a generally cylindrical protective element formed of a flexible, porous material; and a plurality of circular support members that are mounted at regular intervals along a central portion of the cylindrical protective element such that the material forming upper and lower ends of the cylindrical protective element can be brought together to close off the upper and lower ends of the cylindrical protective element, to thereby enclose an article to be protected inside the cylindrical protective element;

wherein a cut is formed in the material of the cylindrical protective element at one end thereof, and wherein the material along edges of the cut can be brought together to close the cylindrical protective element, wherein at least one of the circular support elements located adjacent the cut in the material is also cut such that the cut ends of the at least one circular support element can be separated from each other, and then re-attached to one another.

13. The device of claim 12, wherein each at least one circular support member is formed from a flexible strip having ends that are joined together.

14. The device of claim 13, wherein the ends of the flexible strip of each at least one circular support member have joining elements that allow the ends to be joined together at different locations, to thereby vary a size of the circular support element.

* * * * *